United States Patent [19]

Lupo

[11] 3,827,315
[45] Aug. 6, 1974

[54] AUTOMATIC TRANSMISSION SHIFTING POINT AND FIRMNESS VARIATION CONTROL

[76] Inventor: Joseph Paul Lupo, 116 Burda Ln., New City, N.Y. 10956

[22] Filed: Jan. 23, 1973

[21] Appl. No.: 326,053

[52] U.S. Cl. ............................................. 74/863
[51] Int. Cl. ..................................................... B60k
[58] Field of Search ..................................... 74/863

[56] References Cited
UNITED STATES PATENTS
2,720,793  10/1955  Linsley ................................. 74/863
2,837,932  6/1958  Roller ................................... 74/863

Primary Examiner—Leonard H. Gerin
Attorney, Agent, or Firm—Alphonse R. Noe

[57] ABSTRACT

A method and system providing variable vehicle operator control of the shift points and shifting firmness of a stock automatic transmission to obtain high-performance shifting without mechanical modification of the transmission by intercepting the transmission input torque signal to the transmission hydraulic control system and modifying it to be unrepresentative of actual vehicle engine torque and carburetor opening. Particular suitability is achieved with automatic transmissions having an engine vacuum signal responsive modulator valve.

4 Claims, 3 Drawing Figures

AUTOMATIC TRANSMISSION SHIFTING POINT AND FIRMNESS VARIATION CONTROL

BACKGROUND OF THE INVENTION

This invention relates to a method and system for variably controlling the shift point and shifting firmness of an automatic transmission and more particularly to a method and system for obtaining high-performance shifting of an automatic transmission without physical modification of the transmission itself and while retaining the ability to easily restore normal automatic shifting features.

Modern automatic transmissions are considered to be the most mechanically complex portion of a vehicle. The automatic transmission found on most family passenger vehicles are engineered to provide the maximum degree of shifting smoothness for comfort consistent with the acceleration and performance necessary for ordinary driving conditions. Basically, these automatic transmissions comprise three primary components: a torque converter, a gear system, and a hydraulic control system. The torque converter provides fluid coupling between the engine shaft and the transmission gear train which delivers output to the vehicle wheels. The hydraulic control system includes a highly complicated series of hydraulic valves, pistons, and servo mechanisms which operate the clutches and bands on the gear train. It is the engagement and disengagement of clutches and bands in various combinations which causes the gears of the transmission gear train to operate in various positions for the proper transmission of power to the driving wheels for particular operating conditions.

The basic hydraulic system which controls an automatic transmission includes a hydraulic oil pump which maintains the torque converter full of transmission oil, lubricates the various parts of the transmission and provides transmission oil under pressure to the transmission shift control valves and thence to the clutch pistons and band servo mechanisms. The pressure regulator controls the hydraulic fluid pressure build-up and main line pressure that applies the clutches and bands through the action of pistons and servo mechanisms automatically in response to a pressure signal from a modulator valve, also commonly referred to as a throttle valve, in such a way that the requirements of the clutches and bands are met and proper shift spacing is obtained under all engine and vehicle operating conditions. A pressure booster valve increases control pressure if needed.

Hydraulic control systems for the automatic transmission of passenger vehicles are engineered to control the clutches and bands and shift control valves so that shifts are gradual and smooth and without harshness, while avoiding slippage. Positive control of the modulator or throttle valve is obtained by making the valve responsive to transmission input torque which is the produce of engine torque and torque converter ratio.

Hydraulic control system designers and engineers obtain smooth shifting through various mechanical designs of valves, line passageway restrictions, and the like to avoid operation of servos, clutches or valves too quickly by hydraulic pressure. Thus, these systems are designed to provide, in the ordinary family passenger automobile, smooth acceleration and almost imperceptible shifting without any need for manual control on the part of the operator save for initial shift selection. Shifts occur not only automatically but without any determination by the vehicle operator as to when they will take place since they are governed solely by the system determinations. However, there are many instances in which the vehicle operator wishes to have control approximating the control obtainable with a manual transmission, or at a minimum, wishes to determine the point as well as the firmness with which automatic shifting will occur.

In the automatic transmission provided as stock equipment on the family passenger automobile, shift point and firmness control has not been possible without mechanical modifications to the automatic transmission itself. Such physical changes have included using an ordinary clutch in place of the torque converter, modifying the pressure regulator, making shift control valve passageways larger, utilizing shift plates or manual control valve bodies and the like. While advocates of high-performance vehicle operation where high-performance shifting is desired have used these techniques, these mechanical changes have been both expensive and irreversible in that the transmission has been substantially modified and is no longer suitable for everyday family use. Thus, manual through-the-gears type shifting control of shift points and shifting firmness has been obtained only at the expense of normal automatic transmission smoothness availability.

SUMMARY OF THE INVENTION

The method and system of this invention provide variable vehicle operator control of the shift points and shifting firmness of a stock automatic transmission without the disadvantages associated with prior attempts at obtaining high performance from stock automatic transmissions. Thus, the method and system of this invention enable selection of shift points and degree of shifting firmness by simple adjustment of a selector valve from inside the driver's compartment of the vehicle and without the need for permanent extensive and expensive mechanical modification of the automatic transmission itself.

This is achieved according to the invention by placing a valve in the line from the engine vacuum to the vacuum diaphragm of the modulator valve to intercept the vacuum signal and controllably modify it so that the amount of vacuum signal received by the vacuum diaphragm is controllably adjusted. In this way the modulator valve receives a signal which is not responsive to actual engine torque for the ordinary operating design conditions of the modulator valve and hydraulic control system. The adjusted vacuum signal received by the modulator valve is one of lesser vacuum, signaling that carburetor throttle and engine strain are greater than is actually the case. This causes the modulator pressure in the hydraulic control system to increase with the result that the pressure regulator permits the main line pressure to increase. The shift point is delayed and the firmness and rapidity of shift is increased due to increased line pressure. A wide range of shift points and degrees of firmness can be controllably obtained by adjustment of the selector valve to various positions and yet the valve can be maintained in a full opened position to obtain normal automatic transmission performance.

Accordingly, it is an object of this invention to provide a method of obtaining high-performance shifting in a stock automatic transmission by variably controlling the shift point and firmness of shift of the automatic transmission. By high performance is meant generally that shifting speed and control desired by those using stock vehicles to engage in the approved street or track dragging which is currently popular.

A further object of this invention is the provision of a system for controlling the shifting firmness and shift points of a stock automatic transmission manually from the driver's compartment by modifying the transmission input torque signal without any physical mechanical modifications of the transmission itself.

A yet further object of this invention is the provision of a method and system for obtaining variable control of the shift points and shifting firmness of an automatic transmission by regulating the vacuum signal between the engine and vacuum modulator of an automatic transmission and without permanent modification of the transmission itself.

In addition to permitting high-performance driving, the method and system of this invention permit normal driving or regulation to merely provide slightly faster and firmer shifts in automatic transmissions which generally have a built-in slip to provide slow smooth shifting. Transmission life is also prolonged by this invention which reduces the built-in inefficiency present in automatic transmissions.

BRIEF DESCRIPTION OF THE DRAWINGS

The objects and advantages of this invention will be apparent from the claims and the description of the preferred embodiment of the invention together with reference to the drawings in which:

DESCRIPTION OF THE PREFERRED EMBODIMENTS

Figure 1:
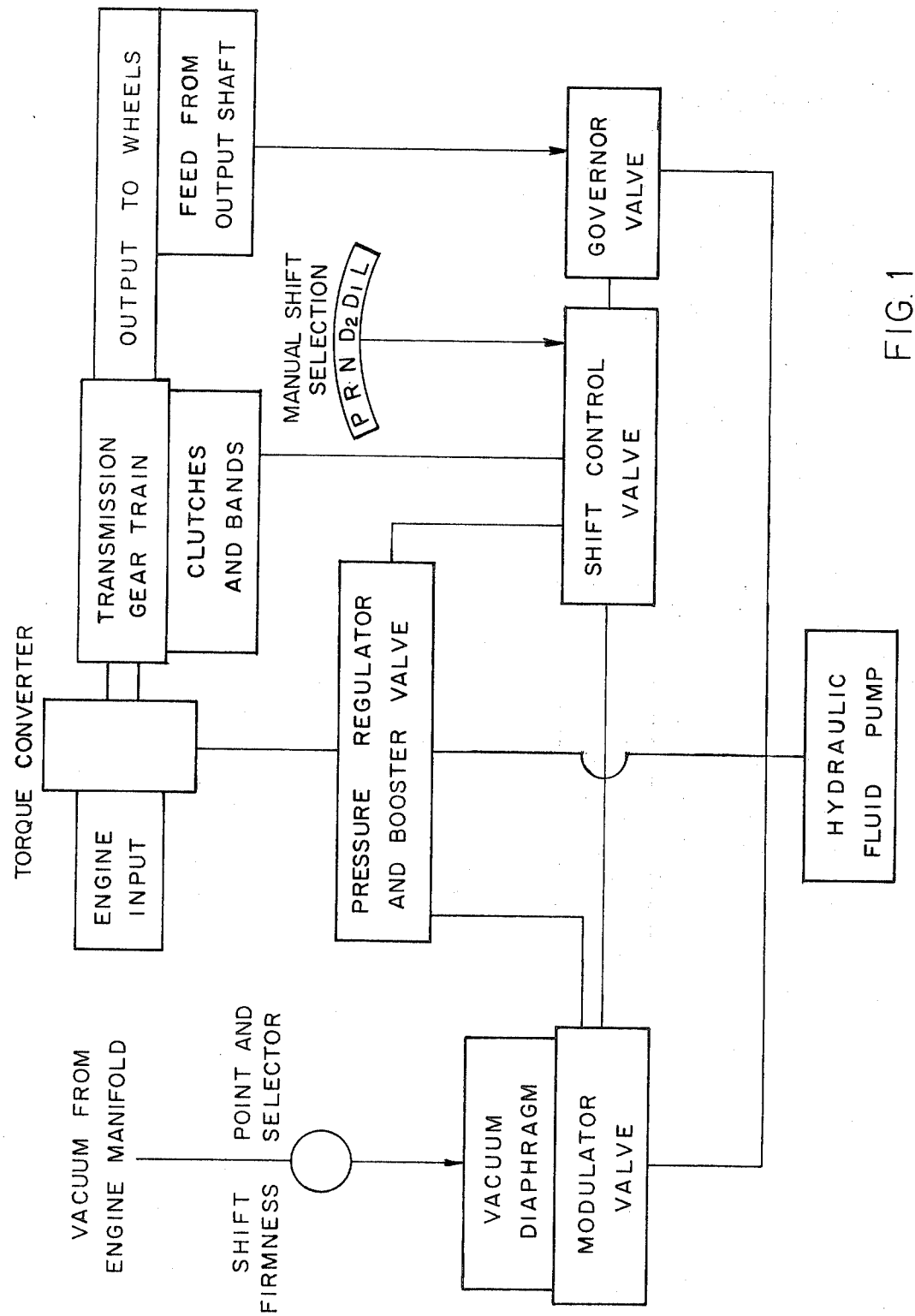
FIG. 1 is a schematic representation, in the form of labeled representations, generally illustrating an automatic transmission system embodying this invention.

Referring to FIG. 1, there is schematically illustrated a passenger vehicle automatic transmission including a control system embodying the shift point and shifting firmness selector of this invention. The labeled boxes at the top of the drawing represent an ordinary automatic transmission in its relation to the other vehicle components including the power source, represented as engine input, which is coupled to the transmission gear train by the fluid drive referred to as a torque converter. The transmission gear train provides output to the wheels for propulsion of the vehicle. The gears in the transmission gear train assume the appropriate relationship for the driving conditions by the application and release of various brake bands and clutches so as to provide up-shifts, direct drive, or down-shifts. These bands and clutches are operated by hydraulic fluid acting on pistons and servo mechanisms and are controlled so as to be actuated only under certain operating conditions by an intricate series of valves represented generally in FIG. 1 as a shift control valve.

Initial selection of gear positions, for example, neutral, for starting the vehicle, reverse, for driving backwards or drive, for proceeding forward is made manually by the vehicle operator with the usual shift control located in the driver compartment and illustrated in FIG. 1 generally as the shift quadrant normally seen by the vehicle operator. Once the vehicle is underway, controlling factors in shifting are vehicle speed and throttle opening which is representative of engine output. The shift control valves are made responsive to the vehicle speed and the engine output through hydraulic fluid pressures known as governor pressure and modulator pressure, also known as throttle pressure, respectively. The modulator or throttle pressure is representative of engine output and is determined by one or more valves indicated generally in FIG. 1 by the labeled representation of a modulator valve.

Responsiveness to engine torque is obtained by connecting the modulator or throttle valve to a diaphragm which is connected directly to the engine manifold vacuum. High vacuum is made to close the modulator valve while a spring opens it. Thus, when the carburetor throttle is operated at increasing throttle the vacuum drops off and the spring opens the transmission modulator or throttle valve so that more pressure is applied to the hydraulic control system. In an actual control system a series of valves operate together to provide close control responsive to slightest movement of carburetor linkage or change in engine load.

When the automatic transmission reaches a certain speed it shifts automatically. Hydraulic pressure applies clutches and bands, shown by representation in FIG. 1, and is controlled by the shift control valves in the hydraulic control system which in turn are responsive to a vehicle speed signal supplied by the governor which is driven by the output shaft. The governor assembly generates a speed sensitive pressure that increases with the vehicle output shaft speed. As shown generally in FIG. 1, a governor valve may permit governor pressure to act on the modulator or throttle valve to cause modulator throttle pressure to decrease as vehicle speed increases. Also, the governor pressure acts on the shift control valve and controls the shift points as well as the modulator or throttle pressure regulation. The modulator pressure, in effect, senses the engine torque and varies the shift points according to throttle opening and raises line pressure proportional to engine torque. The shift control valves are series of valves which control the shifting.

Hydraulic fluid under pressure is provided to the automatic transmission torque converter and the control system including clutch and band servo and piston mechanisms and various control valves by the hydraulic fluid pump. Overall line pressure is controlled by a pressure regulator and booster valve as shown generally in FIG. 1. The pressure regulator regulates the line pressure according to the pump speed and engine torque. When the vehicle is operating, the governor pressure, based on vehicle speed, operates on the shift control valve and is used to control the shift point. As vehicle speed increases governor pressure on the shift valve increases. At the same time, the modulator or throttle pressure is acting on the opposite end of the shift control valve to also control and vary the shift point according to the engine output. The modulator valve receives the vacuum signal from the engine and raises throttle pressure and line pressure proportional to the engine torque so that these pressures increase as the engine vacuum goes down, that is, as the engine strain or throttle is increased. When vehicle speed results in a governor pressure sufficiently high, the throttle pressure on the shift control valve is overcome and the automobile up-shifts.

The shift point and firmness selector, is positioned in the vacuum line extending from the engine manifold to the vacuum diaphragm of the modulator valve. With the selector set to decrease the vacuum signal from the engine manifold to the modulator valve, designed for ordinary operation of the automatic transmission, it receives a different indication of engine torque and carburetor opening than it normally would. By not receiving a proper signal of the vacuum being developed by the engine, the modulator valve causes the modulator on throttle pressure, and also the line pressure, to increase with the result that the governor pressure is not able to overcome the throttle pressure on the shift valve. This delays the shift point. Also, since the line pressure is building up, when the shifting finally does occur it is with greater firmness because of the increased hydraulic pressure operating in the system. By manual adjustment, the shift point and degree of firmness can be selected.

While FIG. 1 shows this essential relationship between the various controls in general illustrative form, it is to be understood that the actual control system of an automatic transmission is highly intricate and complex and involves many valves and mechanisms operating in conjunction with one another. However, for the purposes of understanding this invention this schematic presentation is sufficient since the shifting point and firmness variation control system of this invention requires no special modification of the overall system except for positioning of the selector in the vacuum signal line as shown.

The shift point and shifting firmness selector is a valve-like device which is adjustable to control the vacuum signal that the vacuum diaphragm receives from the engine. Thus, the vacuum signal received by the modulator valve is equal to or less than the actual vacuum being developed by the engine. The difference between the actual vacuum signal generated and that permitted to reach the vacuum diaphragm through the shifting point and firmness selector is variable so that the shift point may be delayed and the line pressure built up to the point where shifting firmness, i.e., speed of shift, is such that rapidity of shift is increased as much as 0.3 of a second. The shift point and shifting firmness selector is located within the vehicle operator's compartment and may be conveniently located on the steering column or dashboard adjacent to the shift selector quadrant or in any desired area. As seen in FIG. 1, the shifting point and firmness selector is installed only in the line running from the engine manifold to the vacuum diaphragm of the modulator valve and thus no modifications to the hydraulic control system of the automatic transmission nor permanent change in operation of the transmission are required. Normal automatic shifting features such as smooth shifts are retained by merely setting the selector so that the valve is in the open position and permits the full vacuum signal to reach the vacuum diaphragm.

Figure 2:
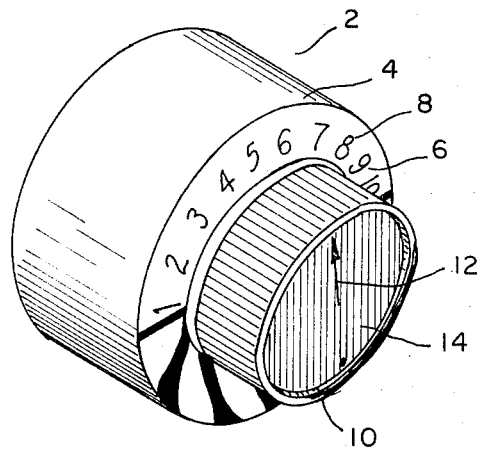
FIG. 2 is a perspective view of a valve assembly embodying the shift point and shifting firmness selector part of the method and system of this invention.

Referring to FIG. 2 there is shown, in perspective view, a shift point and shifting firmness selector which may be conveniently mounted in the interior of the vehicle operator's compartment to be readily accessible to the operator. The shifting point and firmness selector 2 consists of a cylindrical body 4 with a face 6. The face 6 has indicia 8 thereon permitting visual determination of the selected shift point and shifting firmness setting. Selection is made by means of a knurled knob or dial 10 having an indicator 12 on its face 14.

Figure 3:
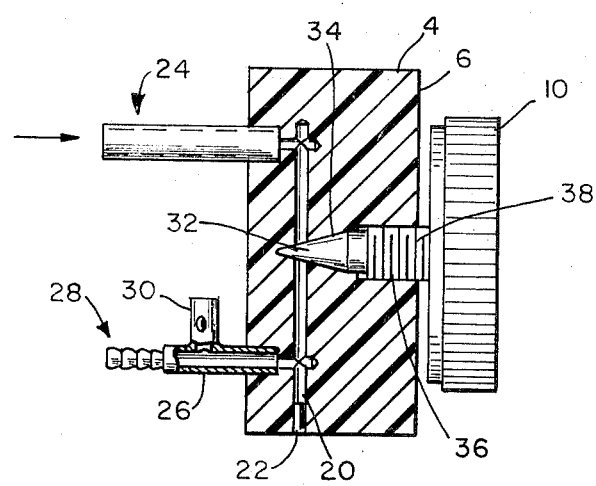
FIG. 3 is a side view, partly in cross-section, of the shift point and shifting firmness selector of FIG. 2.

FIG. 3 shows a sectional side view taken through the center line of the body 4 of the shift point selector 2 of FIG. 2. The body 4 may be made of synthetic plastic or resin, hard rubber or other suitable material. A passageway 20 is formed in the body 4 by drilling three openings in the body. Two of the openings are parallel and spaced apart and transverse to the other which is parallel to the face 6 of the body 4. A closure plug 22 is provided in the latter opening to form the U-shaped passageway 20. The passageway 20 is fitted at its intake end with a tube 24 which may be of aluminum, copper, plastic or the like and which receives a rubber tube or other line fitting from the engine manifold vacuum. At the downstream end of the passageway 20 is also located a tube 26 which is connected by vacuum hose or other suitable means to the vacuum modulator on the automatic transmission. This tube 26 is shown as having an end 28 suitably formed for receiving a hose. A small vent 30 is provided in the tube 26 in order to permit breaking the vacuum after the valve has been closed down entirely should a different setting be desired. The passageway 20 is adjustably blocked in valve-like fashion with a cone-shaped plug 32 which fits in a cone-shaped recess 34 projecting through passageway 20. The plug is operated by the knurled knob 10 and caused to advance or retract by means of threads 36 engaging corresponding tapped portion 38 of the body 4.

The selector may be mounted on a steering column or dashboard of a vehicle using suitable mounting brackets or other means. Installation of the shifting point and firmness selector requires only breaking into the line carrying the vacuum signal from the engine manifold to the vacuum modulator valve and is accomplished in a routine fashion. Mere turning by hand will adjust the knob 10 to cause the cone-shaped plug 32 to constrict passageway 20. The user may calibrate the selector by use of the indicia 8 on the face of the selector body and the indicator 12 on the face of the knurled knob so that repeated selections which give the desirable performance may be made.

In operation, the shift point and shifting firmness selector, when opened wide, permits the vacuum signal to go to the vacuum modulator valve without any change in pressure so that normal shifting is obtained. However, by closing down the passageway the vacuum signal received by the modulator valve is modified so that it is an erroneous indication, according to the modulator valve normal design standards, of which is occurring in the engine. Complete cut-off or blocking of the signal is possible. Thus, up-shifting is delayed while hydraulic line pressure increases resulting in shifting firmness not normally obtained.

The invention permits firmer shifting with sluggish automatic transmissions and prolongs system life by overcoming inefficiencies in the control system and permitting rapid movement of parts. Not only is the method and system of this invention suitable for obtaining high-performance operation with an ordinary passenger vehicle automatic transmission but also for delaying shift for other reasons. Thus, abnormally developed high vacuum, resulting from an engine set to produce vacuum for optional devices not in operation, may be reduced, yet no modification to the transmission is required and return to normal operation is possible with a single rotation of a knob. Thus there has been provided a method and system

I claim:

1. A method of obtaining high-performance shifting in a vehicle automatic transmission having a hydraulic control system by variably controlling the shift point and firmness of the shift of the automatic transmission comprising intercepting the transmission input torque signal to the transmission hydraulic control system, controllably modifying the signal so that it is not representative, under the normal operating design conditions, of vehicle engine torque and carburetor opening, and increasing the transmission hydraulic control line pressure in order that the normal transmission shift point is delayed and the shifting firmness increased.

2. A method as claimed in claim 1, wherein the automatic transmission has an engine vacuum responsive modulator valve and interception and modification of the transmission input torque signal comprises positioning an adjustable valve in the vacuum line which transmits the engine vacuum signal to the vacuum responsive modulator valve and controlling the adjustment of the valve so that vacuum signal is modified to be unrepresentative.

3. A vehicle automatic transmission system including a hydraulic control system responsive to a transmission input torque signal, a source of a vacuum signal normally representative of vehicle engine torque and carburetor opening, a vacuum signal responsive modulator valve and a vacuum line which transmits the vacuum signal to the modulator valve, wherein the improvement comprises a valve body passageway positioned in the vacuum line, a hand actuatable valve plug operatively associated with the valve body and controllably movable to adjustably open or close the valve body passageway and intercept and controllably modify the the vacuum signal so that it is not representative, under normal operating design conditions, of vehicle engine torque and carburetor opening, whereby the hydraulic control system line pressure is increased in order that the normal transmission shift point is delayed and the shifting firmness increased without mechanical modification of the automatic transmission itself.

4. A system as claimed in claim 3, wherein the hand actuable valve plug is located within the vehicle operator compartment and is controllably adjustable from an open position permitting the normally representative vacuum signal to reach the vacuum modulator to one blocking the signal entirely.

* * * * *

UNITED STATES PATENT OFFICE
CERTIFICATE OF CORRECTION

Patent No. 3,827,315          Dated August 6, 1974

Inventor(s)  JOSEPH PAUL LUPO

It is certified that error appears in the above-identified patent and that said Letters Patent are hereby corrected as shown below:

Col. 1, lines 58-59, "produce" should read --product--.

Col. 6, line 60, "system" should read --transmission--.

Col. 7, beginning in line 4, there should be inserted

--of increasing shifting firmness and controlling the shift point of an automatic transmission by utilizing a mechanical device free of potentially troublesome moving parts and which will provide a long-life of troublefree operation. The desired result is achieved in a simple, efficient and relatively economic manner--.

Col. 7, line 9, (claim 1), delete "the", first occurrence.

Col. 7, line 13, (claim 1), delete "the".

Col. 8, line 12, (claim 3), delete "the", second occurrence.

Signed and sealed this 17th day of December 1974.

(SEAL)
Attest:

McCOY M. GIBSON JR.
Attesting Officer

C. MARSHALL DANN
Commissioner of Patents